United States Patent
Lee et al.

(10) Patent No.: US 11,160,075 B2
(45) Date of Patent: *Oct. 26, 2021

(54) SLOT FORMAT INDICATOR SIGNALING IN WIRELESS COMMUNICATION SYSTEMS

(71) Applicant: QUALCOMM Incorporated, San Diego, CA (US)

(72) Inventors: Heechoon Lee, San Diego, CA (US); Wanshi Chen, San Diego, CA (US); Peter Gaal, San Diego, CA (US); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/870,479

(22) Filed: May 8, 2020

(65) Prior Publication Data

US 2020/0275441 A1 Aug. 27, 2020

Related U.S. Application Data

(63) Continuation of application No. 16/015,708, filed on Jun. 22, 2018, now Pat. No. 10,660,090.

(Continued)

(51) Int. Cl.
*H04W 72/04* (2009.01)
*H04L 5/00* (2006.01)

(52) U.S. Cl.
CPC ......... *H04W 72/0446* (2013.01); *H04L 5/001* (2013.01); *H04L 5/0053* (2013.01); *H04W 72/042* (2013.01)

(58) Field of Classification Search
CPC .......... H04W 72/0446; H04W 72/042; H04W 72/1289; H04L 5/0053; H04L 5/001
See application file for complete search history.

(56) References Cited

U.S. PATENT DOCUMENTS 10,200,991 B2 2/2019 Dinan
10,341,998 B2 7/2019 Nogami et al.
(Continued)

OTHER PUBLICATIONS

AT&T: "DCI Design for TDD Operation", 3GPP Draft; R1-1707730, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017 May 7, 2017, XP051263081, Retrieved from the Internet: URL:http://www.3gpp.org/ftp/tsg_ran/WG1_RL1/TSGR1_89/ Docs/ [retrieved on May 7, 2017], 5 pages.
(Continued)

*Primary Examiner* — Brian T O Connor
(74) *Attorney, Agent, or Firm* — Qualcomm Incorporated

(57) ABSTRACT

The present application relates to slot format indicator signaling in wireless communication systems. For example, a network entity may configure a slot format to include one or more symbol partitions and a transmission assignment for each of the one or more symbol partitions, and communicate with to at least one UE according to the configured slot format. In another example, a UE may configure at least one slot format according to at least one of a semi-static configuration via a broadcast or unicast transmission, or a dynamic configuration via a group common physical downlink control channel (GC-PDCCH), and communicate with the network entity according to the slot format.

23 Claims, 6 Drawing Sheets

Related U.S. Application Data

(60) Provisional application No. 62/524,908, filed on Jun. 26, 2017.

(56) References Cited

U.S. PATENT DOCUMENTS

| | | | |
|---|---|---|---|
| 10,368,350 | B2 | 7/2019 | Majmundar et al. |
| 10,660,090 | B2 * | 5/2020 | Lee .................. H04L 5/001 |
| 2018/0302889 | A1 | 10/2018 | Guo et al. |
| 2018/0367253 | A1 | 12/2018 | Nammi et al. |
| 2018/0368116 | A1 | 12/2018 | Liao et al. |
| 2018/0368142 | A1 | 12/2018 | Liou |
| 2018/0368168 | A1 | 12/2018 | Jung et al. |
| 2018/0376476 | A1 | 12/2018 | Lee et al. |
| 2019/0116007 | A1 | 4/2019 | Yi et al. |
| 2019/0174490 | A1 | 6/2019 | Dinan |
| 2019/0190654 | A1 | 6/2019 | You et al. |
| 2019/0200355 | A1 | 6/2019 | Baldemair et al. |
| 2019/0215217 | A1 | 7/2019 | Kim et al. |
| 2019/0215831 | A1 | 7/2019 | Baldemair et al. |
| 2019/0261380 | A1 | 8/2019 | Iyer et al. |

OTHER PUBLICATIONS

Huawei et al., "UE Behavior Related to Group-Common PDCCH", 3GPP Draft; R1-1710476, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017 Jun. 17, 2017, XP051305071, Retrieved from the Internet: URL:http://www.3gpp.org/ftp/tsg_ran/WG1_RL1/TSGR1_AH/NR_AH_1706/Docs/ [retrieved on Jun. 17, 2017], 4 pages.

International Search Report and Written Opinion—PCT/US2018/039258—ISA/EPO—dated Sep. 19, 2018.

Qualcomm Incorporated: "View on Group Common PDCCH", 3GPP Draft; R1-1702626_GROUP_COMMON_PDCCH, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 18, 2017 Feb. 7, 2017, XP051221483, Retrieved from the Internet URL: http://www.3gpp.org/ftp/tsg_ran/WG1_RL1/TSGR1_88/Docs/ [retrieved on Feb. 7, 2017], 4 pages.

\* cited by examiner

SLOT FORMAT INDICATOR SIGNALING IN WIRELESS COMMUNICATION SYSTEMS

CROSS-REFERENCE TO RELATED APPLICATION(S)

This application is a continuation of U.S. Non-Provisional application Ser. No. 16/015,708, entitled "SLOT FORMAT INDICATOR SIGNALING IN WIRELESS COMMUNICATION SYSTEMS" and filed on Jun. 22, 2018, and claims the benefit of U.S. Provisional Application Ser. No. 62/524,908, entitled "SLOT FORMAT INDICATOR SIGNALING IN WIRELESS COMMUNICATION SYSTEMS" and filed on Jun. 26, 2017, each of which is expressly incorporated by reference herein in its entirety.

BACKGROUND

Aspects of the present disclosure relate generally to wireless communication networks, and more particularly, to configuring a slot format for communication in a wireless communication system.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-low latency (ULL) and/or ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, signaling information may provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method for wireless communications at a network entity. The method may include configuring a slot format according to at least one of a semi-static configuration via a broadcast or unicast transmission, or a dynamic configuration via a group common physical downlink control channel (GC-PDCCH). The method may further include communicating with at least one user equipment (UE) according to the configured slot format.

In another aspect, the present disclosure includes a network entity apparatus for wireless communication including a memory and a processor in communication with the memory. The processor may be configured to configure a slot format according to at least one of a semi-static configuration via a broadcast or unicast transmission, or a dynamic configuration via a GC-PDCCH. The at least one processor may further be configured to communicate with at least one UE according to the configured slot format.

In an additional aspect, the present disclosure includes a network entity apparatus for wireless communication. The apparatus may include means for configuring a slot format according to at least one of a semi-static configuration via a broadcast or unicast transmission, or a dynamic configuration via a GC-PDCCH. The apparatus may further include means for communicating with at least one UE according to the configured slot format.

In yet another aspect, the present disclosure includes a computer-readable medium for wireless communications at a network entity. The computer-readable medium may include code for configuring a slot format according to at least one of a semi-static configuration via a broadcast or unicast transmission, or a dynamic configuration via a GC-PDCCH. The computer-readable medium may further include code for communicating with at least one UE according to the configured slot format.

In an aspect, the present disclosure includes a method for wireless communications at a UE. The method may include configuring a slot format according to at least one of a semi-static configuration via a broadcast or unicast transmission, or a dynamic configuration via a GC-PDCCH. The method may further include communicating with a network entity according to the slot format.

In another aspect, the present disclosure includes a UE apparatus for wireless communication including a memory and a processor in communication with the memory. The processor may be configured to configure a slot format according to at least one of a semi-static configuration via a broadcast or unicast transmission, or a dynamic configuration via a GC-PDCCH. The processor may further be configured to communicate with a network entity according to the slot format.

In an additional aspect, the present disclosure includes a UE apparatus for wireless communication. The apparatus may include means for configuring a slot format according to at least one of a semi-static configuration via a broadcast or unicast transmission, or a dynamic configuration via a GC-PDCCH. The apparatus may further include means for communicating with a network entity according to the slot format.

In yet another aspect, the present disclosure includes a computer-readable medium for wireless communications at a UE. The computer-readable medium may include code for configuring a slot format according to at least one of a semi-static configuration via a broadcast or unicast transmission, or a dynamic configuration via a GC-PDCCH. The computer-readable medium may include code for communicating with a network entity according to the slot format.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
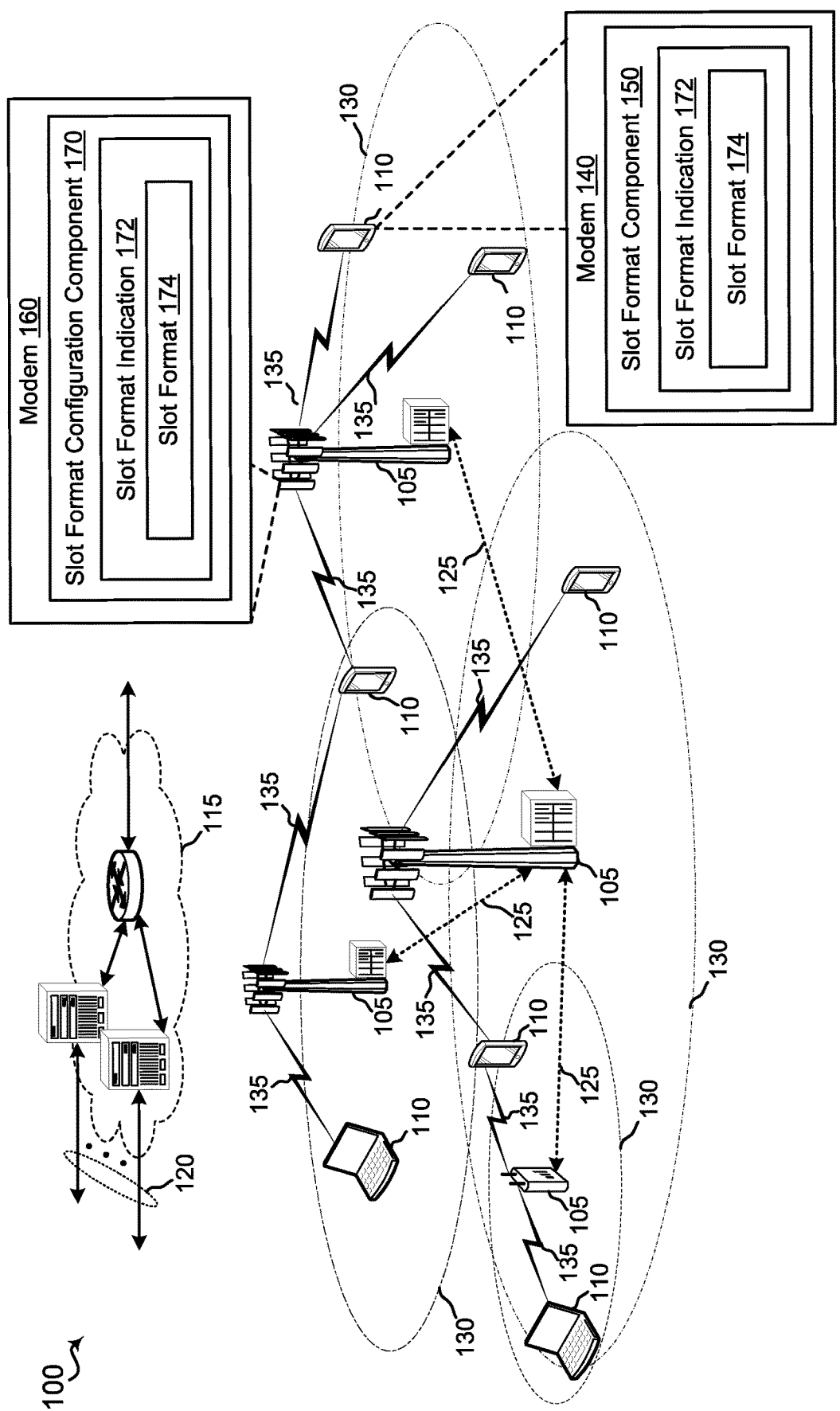
FIG. 1 is a schematic diagram of an example of a wireless communication network including at least one base station having a slot format configuration component and at least one user equipment (UE) having a slot format component.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to slot format indicator signaling in wireless communication systems. Specifically, in a new radio wireless communication system, a group-common physical downlink control channel (PDCCH) may carry or otherwise transmit slot format structure information. The slot format information may be information from which the UE can derive at least which symbols in a slot are assigned or allocated for downlink communication, uplink communication, and/or other communication. In some aspects, the other communication may correspond to an unknown type or state such that the UE may not assume a transmission assignment or status for the symbol labeled or identified as other. In particular, a slot format indication may be transmitted in a group-common PDCCH (GC-PDCCH) to indicate the slot format related information for one or more slots. Further, the slot format information may inform or otherwise indicate to the UEs of a number of slots and information related to the slot format(s) associated with the number of slots. However, in instances where GC-PDCCH goes unutilized for slot format indication transmission, the UE may be unaware of the slot format. Thus, it may be desirable for a multi-stage configuration of slot formats utilizing different signaling techniques.

As such, the present aspects provide efficient handling of slot formats using at least a two-stage configuration including a semi-static configuration via a system information block (SIB) or radio resource control (RRC) and a dynamic configuration via a GC-PDCCH. For example, in an aspect, a network entity may configure at least one slot format according to at least one of a semi-static configuration via a broadcast or unicast transmission, or a dynamic configuration via a GC-PDCCH. Moreover, the network entity may communicate with a UE according to the configured slot format. Additionally, in an aspect, a UE may configure a slot format according to at least one of a semi-static configuration via a broadcast or unicast transmission, or a dynamic configuration via a GC-PDCCH. The UE may further communicate with a network entity according to the configured slot format. Additional features of the present aspects are described in more detail below with respect to FIGS. 1-6.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 may include at least one UE 110 in communication with a base station 105. The base station 105 may have a modem 160, which in turn includes a slot format configuration component 170 that may configure a slot format 174 to include one or more symbol partitions and a transmission assignment (e.g., downlink, uplink, other, and/or empty) for each of the one or more symbol partitions. For example, in some aspects, for a 14 symbol slot where each symbol can be assigned or allocated for downlink, uplink, empty, or unknown, up to 28 bits may be utilized to represent the possible combinations (e.g., 2 bit per symbol times 14 symbols).

In an aspect, the slot format configuration component 170 may configure the slot into mini-slot partitions. That is, the slot may include two or more mini-slot partitions each having a symbol length of one more symbols. For example, a first partition may include three symbols, a second partition may include 2 symbols, a third partition may include 2 symbols, a fourth partition may include 2 symbols, a fifth partition may include 2 symbols, and a sixth partition may include three symbols. The slot format configuration component 170 may also configure the available transmission options for each partition. In an example, a first partition may be downlink only (e.g., 0 bit), a second partition a downlink or uplink (e.g., 1 bit), and/or a third partition may be a downlink, uplink, empty, or unknown (e.g., 2 bits). Further, each slot may be represented by a sum of bits for each partition. In some aspects, an empty allocation may permit UEs to use the resource for interference measurement and may assume no transmission occurrence. In some aspects, the other allocation may be subdivided into additional allocations or transmission options such as a blank allocation, and/or a sidelink allocation.

The slot format configuration component 170 may determine to transmit a slot format indication 172 including the at least one slot format 174 according to at least one of a semi-static configuration via a broadcast (e.g., SIB) or unicast (e.g., RRC) transmission, or a dynamic configuration via a GC-PDCCH. Specifically, semi-static configuration via SIB (e.g., broadcast) may provide more efficiency given that the given slot formats may be common across UEs. However, the broadcast message overhead may increase. Semi-static configuration via RRC (e.g., unicast) may provide less overhead in broadcast messages as the configuration overhead is given per UE configuration. In some aspects, semi-static configuration may not result in the same slot formats for all the slots. Rather, different slot formats may be configured over certain length of slots.

The slot format configuration component 170 may also utilize dynamic configuration via GC-PDCCH to transmit a slot format indication 172 including the slot format 174. For example, when GC-PDCCH is utilized used for the slot(s), the slot format from the semi-static and/or dynamic configuration may be assumed or adopted. In other words, the dynamic configuration may override the slot formats from the semi-static configuration. In some aspects, the slot formats may be over multiple slots for both the semi-static configuration and dynamic configuration.

Moreover, the slot format configuration component 170 may transmit the slot format indication including the at least one slot format to the UE 110 according to at least one of the determined semi-static configuration or the dynamic configuration. In some aspects, to indicate the slot format 174, the slot format configuration component 170 may list all of the allowed slot formats as a table and indicate an index value in the table within the slot format indication 172.

The slot format configuration component 170 may be configured to provide interference cancellation assistance. Specifically, when the slot format indication 172 is configurable, determining the actual slot format from one or more neighbor cells may be difficult by decoding the GC-PDCCH since different cells may adopt different slot format indication methods, or utilize the table. As such, the base station 105 may share or transmit the slot format indication 172 for neighbor cells with serving UEs. That is, the base station 105 may indicate the slot format 174 to neighboring base stations 105, but not the configured slot format 174. For example, the slot format configuration component 170 may also communicate different slot format methods per physical cell identity (PCI) in the event one or more neighbor cells adopt different slot formats.

The slot format configuration component 170 may be configured to handle multiple bandwidths and/or components carriers when or as part of configuring the slot format 174. Specifically, the slot format 174 may be common for each bandwidth or component carrier or different per bandwidth or component carrier. For example, when slot formats including slot format 174 are different for one or more bandwidths or component carriers, each bandwidth or component carrier may carry the GC-PDCCH. In some aspects, when the slot format 174 is common for one or more bandwidths or component carriers, the UE 110 may be configured to monitor one GC-PDCCH for bandwidths or component carriers sharing the slot format 174. The base station 105 may still transmit GC-PDCCH for all the bandwidths or component carriers.

In some aspects, the slot format configuration component 170 may be configured to permit interpretation of multiple GC-PDCCHs. Specifically, the interpretation of the GC-PDCCH may be a function of the semi-static configuration according to the SIB or RRC, and especially for the symbols corresponding to an unknown allocation. Symbols corresponding to other fields such as downlink, uplink, and/or empty may also have different interpretations. In one example, the slot format 174 may be configured so as to permit a determination (e.g., by a UE 110) of whether or not a massive machine type communication (mMTC), an ultra-reliable low latency communication (URLLC), and/or sidelink related information exists in GC-PDCCH.

The slot format configuration component 170 may be configured to provide gating off interpretation. Specifically, the slot format configuration component 170 may provide gate off periodic signals. In some aspects, if the GC-PDCCH is not detected, periodic signals may be determined to be off or deactivated. In some aspects, if the GC-PDCCH is not detected, periodic signals may be determined to be on or activated. Further, gating off periodic signals may be implemented differently for downlink and uplink via GC-PDCCH. For example, on the downlink, if GC-PDCCH is not detected, downlink periodic signals may be determined off, while on the uplink, the periodic signals can be determined on.

Wireless communication network 100 may also include at least one UE 110 with a modem 140 having a slot format component 150 to receive a slot format indication 172 including at least one slot format 174 according to at least one of a semi-static configuration via a broadcast (e.g., SIB) or unicast (e.g., RRC) transmission, or a dynamic configuration via a GC-PDCCH. The UE 110 may then, via the slot format component 150, determine the at least one slot format 174 based on the slot format indication 172, and communicate with at least one base station 105 according to the slot format 174.

In some aspects, the UE 110, via slot format component 150, may be configured to monitor one GC-PDCCH for bandwidths or component carriers sharing the slot format 174 when the slot format 174 is common for one or more bandwidths or component carriers. In some aspects, the UE 110 may be configured to monitor for at most one GC-PDCCH carrying slot format related information in a slot.

In some aspects, the slot format component 150 may be configured to interpret or device information from multiple GC-PDCCHs. Specifically, the slot format component 150 may interpret the GC-PDCCH as a function of the semi-static configuration according to the SIB or RRC, notably for the symbols corresponding to an unknown allocation. Symbols corresponding to other fields such as downlink, uplink, and/or empty may also have different interpretations. For example, the slot format 174 may be configured so as to permit a determination by the slot format component 150 of whether or not an mMTC, an URLLC, and/or sidelink related information exists in GC-PDCCH.

The slot format component 150 may be configured to provide interference cancellation assistance. Specifically, when the slot format indication 172 is configurable, determining the actual slot format from one or more neighbor cells may be difficult by decoding the GC-PDCCH since different cells may adopt different slot format indication methods, or utilize the table. As such, the UE 110 may share or transmit the slot format indication 172 for neighbor cells with serving UEs. That is, the UE 110 may provide the slot format indication 172 to neighboring base stations 105, or UEs served by neighboring base stations 105, but not the configured slot format 174. For example, a one bit indication may be used by the UE 110 to communicate the slot format indication 172 and/or whether the same slot format 174 is used by neighboring cells. Further, for instance, the slot format configuration component 170 may also communicate different slot format methods per PCI in the event one or more neighbor cells adopt different slot formats.

The slot format component 150 may be configured to determine a gating off status based on GC-PDCCH. In some aspects, if the GC-PDCCH is not detected, periodic signals may be determined by the slot format component 150 to be off or deactivated. In some aspects, if the GC-PDCCH is not detected, periodic signals may be determined by the slot format component 150 to be on or activated. Further, gating off periodic signals may be implemented differently for downlink and uplink via GC-PDCCH. For example, on the downlink, if GC-PDCCH is not detected, downlink periodic signals may be determined off, while on the uplink, the periodic signals can be determined on by the slot format component 150.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
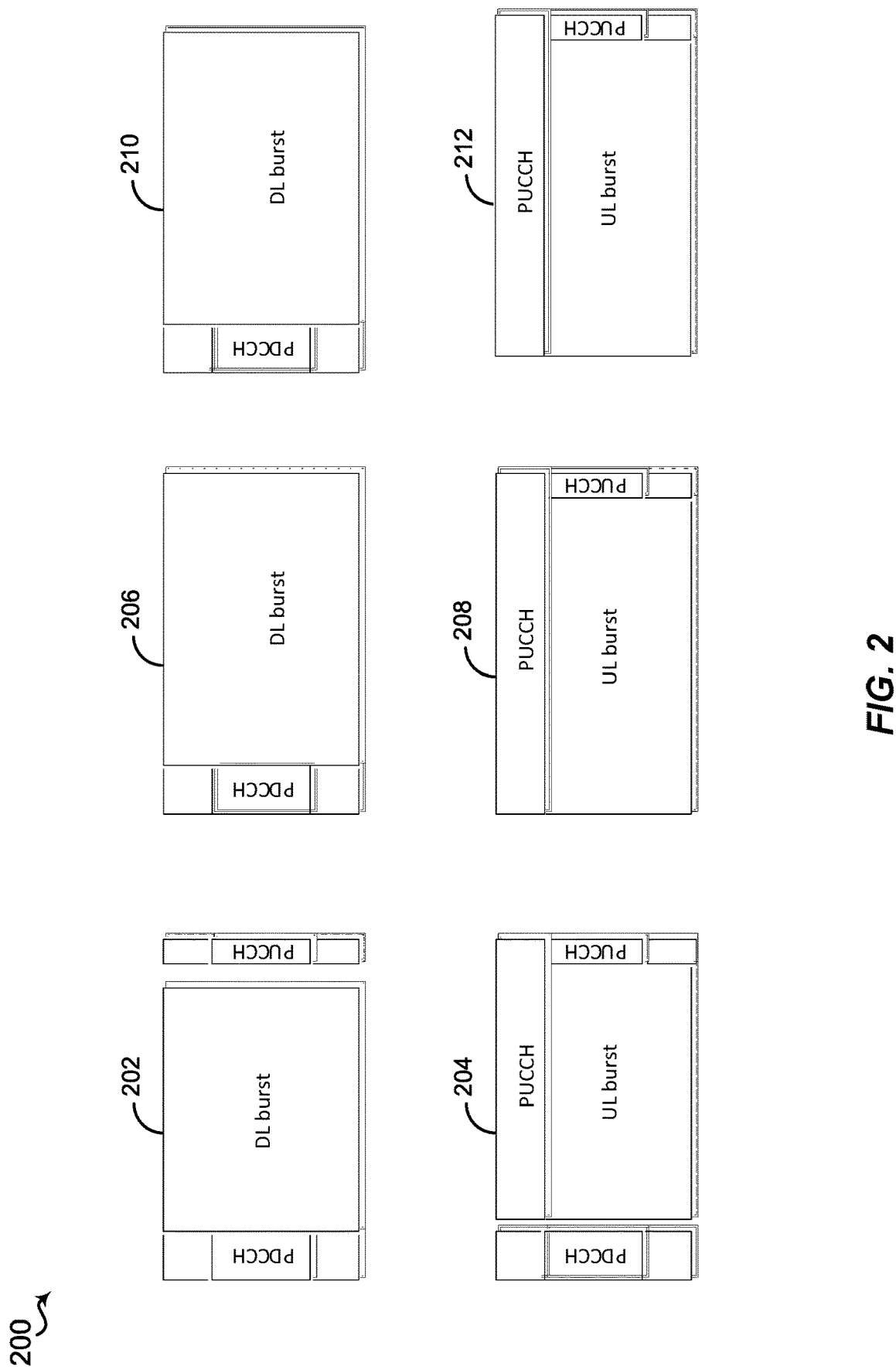
FIG. 2 is a conceptual diagram of example slot format structures for transmitting information.

FIG. 2 is a conceptual diagram of example slot structures 200 for transmitting data on the uplink and/or downlink. For example, slot structure 202 may correspond to a downlink centric slot according to time division duplexing (TDD). The slot structure 202 may include resources for PDCCH, a downlink (DL) burst, and a physical uplink control channel (PUCCH). Slot structure 204 may corresponds to an uplink centric slot according to TDD. The slot structure 204 may include resources for PDCCH, an uplink (UL) burst, and PUCCH. Slot structure 206 may correspond to a downlink only slot according to TDD. The slot structure 206 may include resources for PDCCH and a downlink (DL) burst. Slot structure 210 corresponds to a downlink (DL) slot according to frequency division duplexing (FDD) having a similar structure as slot structure 206. Slot structure 208 correspond to an uplink (UL) only slot according to TDD. The slot structure 208 may include resources for PUCCH and an uplink burst. Slot structure 212 corresponds to an uplink (UL) slot according to FDD having a similar structure as slot structure 208.

The example slot structures 200 may include one or more empty symbols (e.g., according to TDD and/or FDD), where an empty symbol refers to the symbols not in use (e.g., no transmission). In some aspects, the example slot structures 200 may include one or more reserved or unknown symbols (e.g., according to TDD and/or FDD), where a reserved symbol refers to the symbols reserved for future compatibility. In some aspects, the length of PDCCH, PDSCH, PUCCH, PUSCH may vary depending on the configuration.

Figure 3:
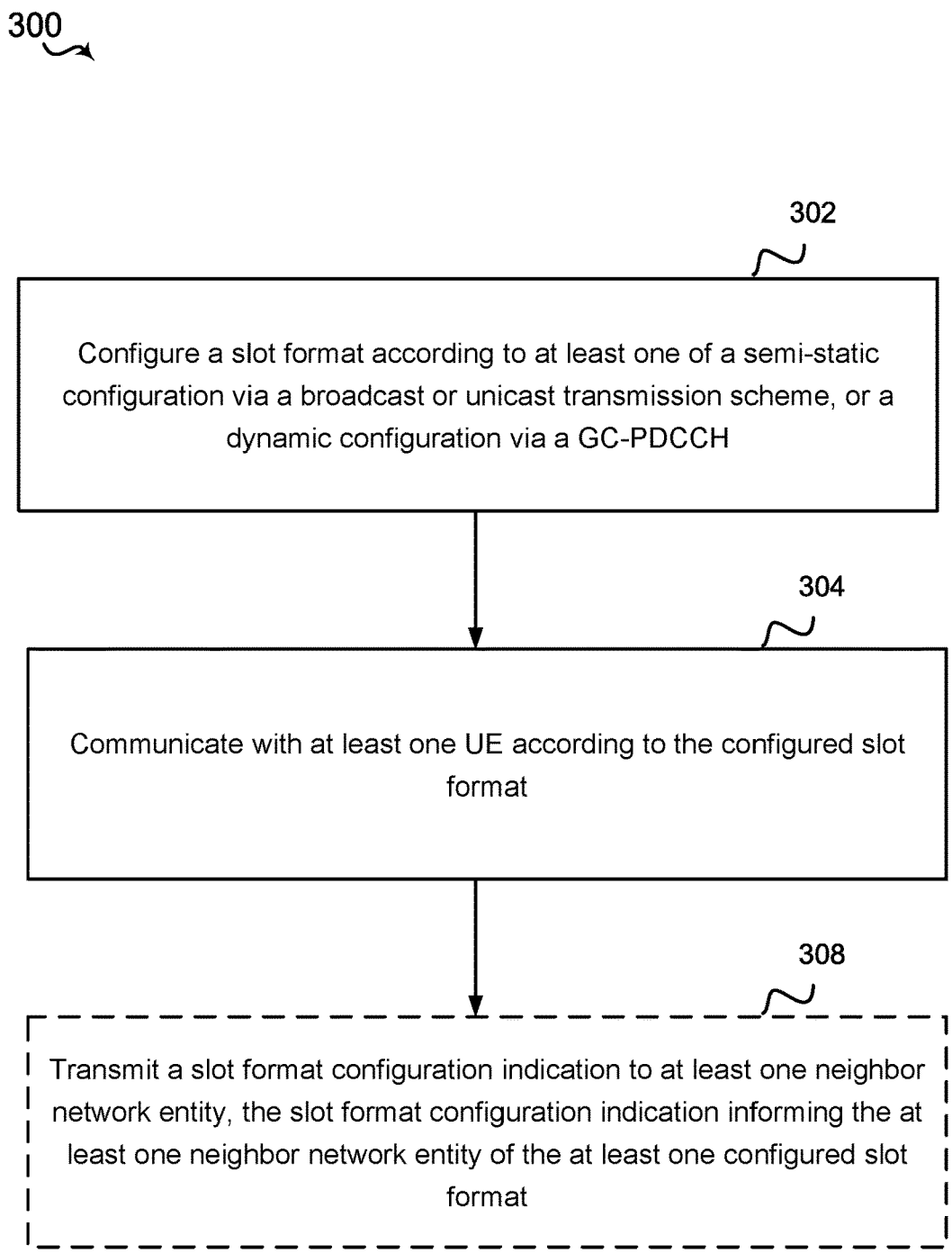
FIG. 3 is a flow diagram of an example of a method of wireless communication at a network entity.

Referring to FIG. 3, for example, a method 300 of wireless communication in operating a network entity such as base station 105 including the slot format configuration component 170 according to the above-described aspects to configure a slot format according to one or more of the herein-defined actions. The one or more processors 612 may, in conjunction with the slot format configuration component 170, perform the one or more of the herein-defined actions.

At block 302, the method 300 may configure a slot format according to at least one of a semi-static configuration via a broadcast or unicast transmission scheme, or a dynamic configuration via a GC-PDCCH. For example, in an aspect, base station 105 may execute slot format configuration component 170 to configure or configure a slot format 174 according to at least one of a semi-static configuration via a broadcast or unicast transmission scheme, or a dynamic configuration via a GC-PDCCH.

In some aspects, the slot format 174 may apply to or be for a number of or certain length of slots. In some aspects, the broadcast transmission may correspond to a cell specific radio resource connection (RRC) and/or the unicast transmission may correspond to a UE-specific RRC.

In some aspects, configuring the slot format 174 according to the semi-static configuration may include configuring the slot format 174 to include one or more symbol partitions and a transmission assignment for each of the one or more symbol partitions. Further, in some aspects, the one or more symbol partitions correspond to a length longer than a slot or shorter than a slot. In some aspects, the transmission assignment for each of the one or more symbol partitions may include at least one of a downlink assignment, an uplink assignment, an empty assignment, or an unknown or flexible assignment.

In some aspects, configuring the slot format 174 according to the dynamic configuration may include indicating an index value referencing the slot format 174 in a table of slot formats. Further, although not shown, the method 300 may include transmitting a slot format indication including the configured slot formant 174 via the GC-PDDCH.

At block 304, the method 300 may communicate with at least one UE according to the configured slot. For example, in an aspect, base station 105 may execute slot format configuration component 170 and/or one or more communication components to determine to communicate with at least one UE 110 according to the configured slot 174.

In some aspects, the at least one slot format 174 may include a first slot format associated with the semi-static configuration and a second slot format associated with the dynamic configuration. At block 306, the method 300 may transmit a slot format configuration indication to at least one neighbor network entity, the slot format configuration indication informing the at least one neighbor network entity of the at least one configured slot format. For example, in an aspect, base station 105 may execute slot format configuration component 170 to transmit a slot format configuration indication 172 to at least one neighbor base station or cell, the slot format configuration indication informing the at least one neighbor network entity of the at least one configured slot format (e.g., without providing the slot format 174).

In some aspects, the slot format 174 may be one of common or distinct across one or more bandwidths or component carriers, and wherein each of the one or more bandwidths or component carriers carry the GC-PDCCH when the slot format is distinct across one or more bandwidths or component carriers.

Figure 4:
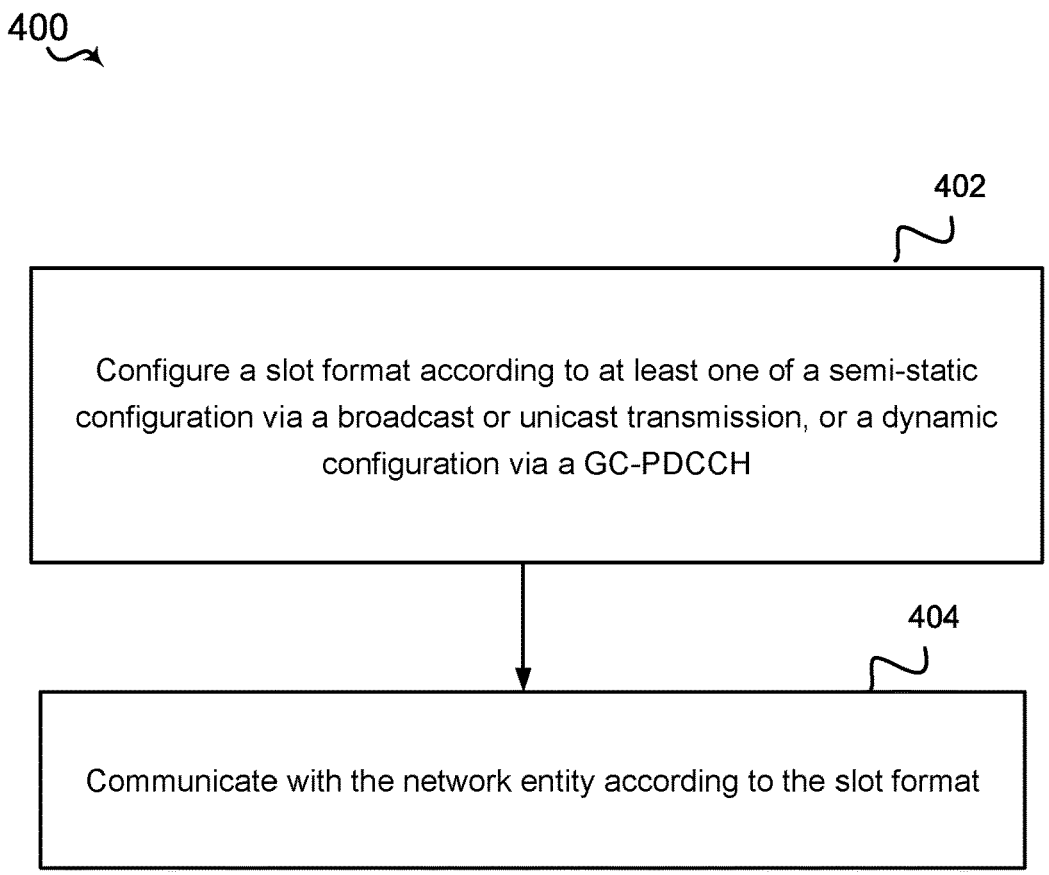
FIG. 4 is a flow diagram of an example of a method of wireless communication at a UE.

Referring to FIG. 4, for example, a method 400 of wireless communication in operating UE 110 including the slot format component 150 according to the above-described aspects to configure a slot format according to one or more of the herein-defined actions. The one or more processors 612 may, in conjunction with the slot format component 150, perform the one or more of the herein-defined actions.

At block 402, the method 400 may configure a slot format according to at least one of a semi-static configuration via a broadcast or unicast transmission, or a dynamic configuration via a GC-PDCCH. For example, in an aspect, the UE 110 may execute the slot format component 150 to configure a slot format 174 according to at least one of a semi-static configuration via a broadcast or unicast transmission, or a dynamic configuration via a GC-PDCCH.

In some aspects, the broadcast transmission may correspond to a cell specific radio resource connection (RRC) and/or the unicast transmission may correspond to a UE-specific RRC. In some aspects, the slot format 174 may include one or more symbol partitions. In some aspects, configuring the slot format 174 according to the semi-static configuration may include configuring the slot format 174 to include one or more symbol partitions and a transmission assignment for each of the one or more symbol partitions.

Further, in some aspects, the one or more symbol partitions may be of a length longer or shorter than a slot. Further, in some aspects, the transmission assignment for each of the one or more symbol partitions may include at least one of a downlink assignment, an uplink assignment, an empty assignment, or an unknown or flexible assignment. In some aspects, the slot format indication may further include an index value referencing the slot format in a table of slot formats. In some aspects, configuring the slot format 174 may include configuring the slot format 174 based on a SIB signaling or a RRC signaling associated with the semi-static configuration.

At block 404, the method 400 may communicate with the network entity according to the slot format. For example, in an aspect, the UE 110 may execute the slot format component 150 to communicate with the base station 105 according to the slot format 174.

In some aspects, the slot format may be common across one or more bandwidths or component carriers such that the UE 110 may monitor one GC-PDCCH for the one or more bandwidths or component carriers sharing the slot format. In some aspects, although not shown, the method 400 may determine whether the GC-PDCCH has been detected in the received slot format indication, and determine that periodic signaling is at least one of activated or deactivated based on determining that the GC-PDCCH has not been detected in the received slot format indication.

Figure 5:
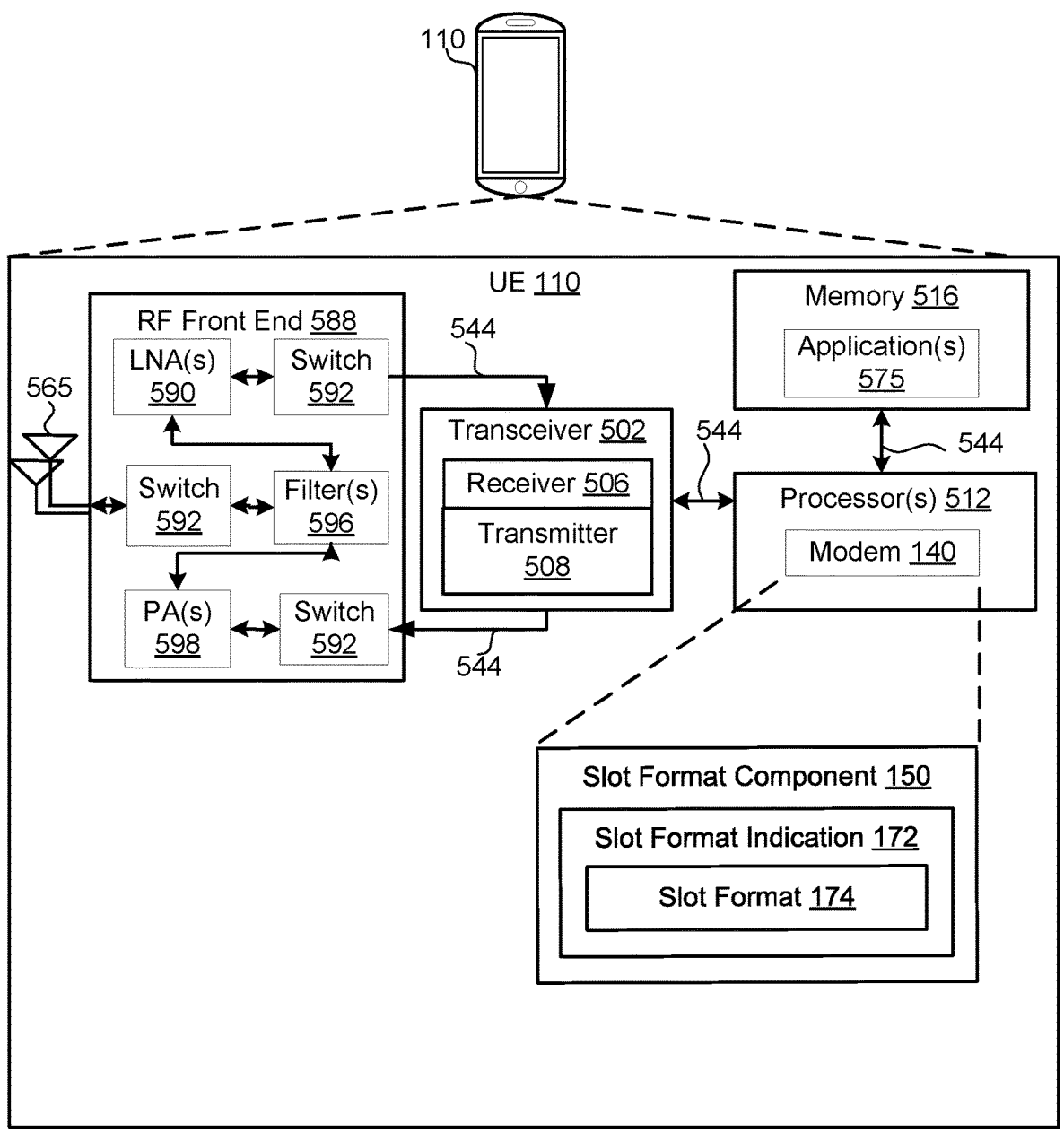
FIG. 5 is a schematic diagram of example components of the UE of FIG. 1.

Referring to FIG. 5, one example of an implementation of UE 110 may include a variety of components, some of which have already been described above, but including components such as one or more processors 512 and memory 516 and transceiver 502 in communication via one or more buses 544, which may operate in conjunction with modem 140 and slot format component 150 as described herein. Further, the one or more processors 512, modem 140, memory 516, transceiver 502, radio frequency (RF) front end 588 and one or more antennas 565, may be configured to support voice and/or data calls (simultaneously or non-simultaneously) in one or more radio access technologies. In some aspects, the modem 514 may be the same as or similar to the modem 140.

In an aspect, the one or more processors 512 can include a modem 140 that uses one or more modem processors. The various functions related to resource identification component 150 may be included in modem 140 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 140 associated with resource identification component 150 may be performed by transceiver 502.

Also, memory 516 may be configured to store data used herein and/or local versions of applications 575 or resource identification component 150 and/or one or more of its subcomponents being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining resource identification component 150 and/or one or more of its subcomponents, and/or data associated therewith, when UE 110 is operating at least one processor 512 to execute resource identification component 150 and/or one or more of its subcomponents.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a RF receiver. In an aspect, receiver 506 may receive signals transmitted by at least one base station 105. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may include, but is not limited to, an RF transmitter.

Moreover, in an aspect, UE 110 may include RF front end 588, which may operate in communication with one or more antennas 565 and transceiver 502 for receiving and transmitting radio transmissions, for example, wireless communications transmitted by at least one base station 125 or wireless transmissions transmitted by UE 110. RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and a corresponding specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver may be tuned to operate at specified frequencies such that UE 110 can communicate with, for example, one or more base stations 125 or one or more cells associated with one or more base stations 125. In an aspect, for example, modem 140 can configure transceiver 502 to operate at a specified frequency and power level based on the UE configuration of the UE 110 and the communication protocol used by modem 140.

In an aspect, modem 140 can be a multiband-multimode modem, which can process digital data and communicate with transceiver 502 such that the digital data is sent and received using transceiver 502. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 6:
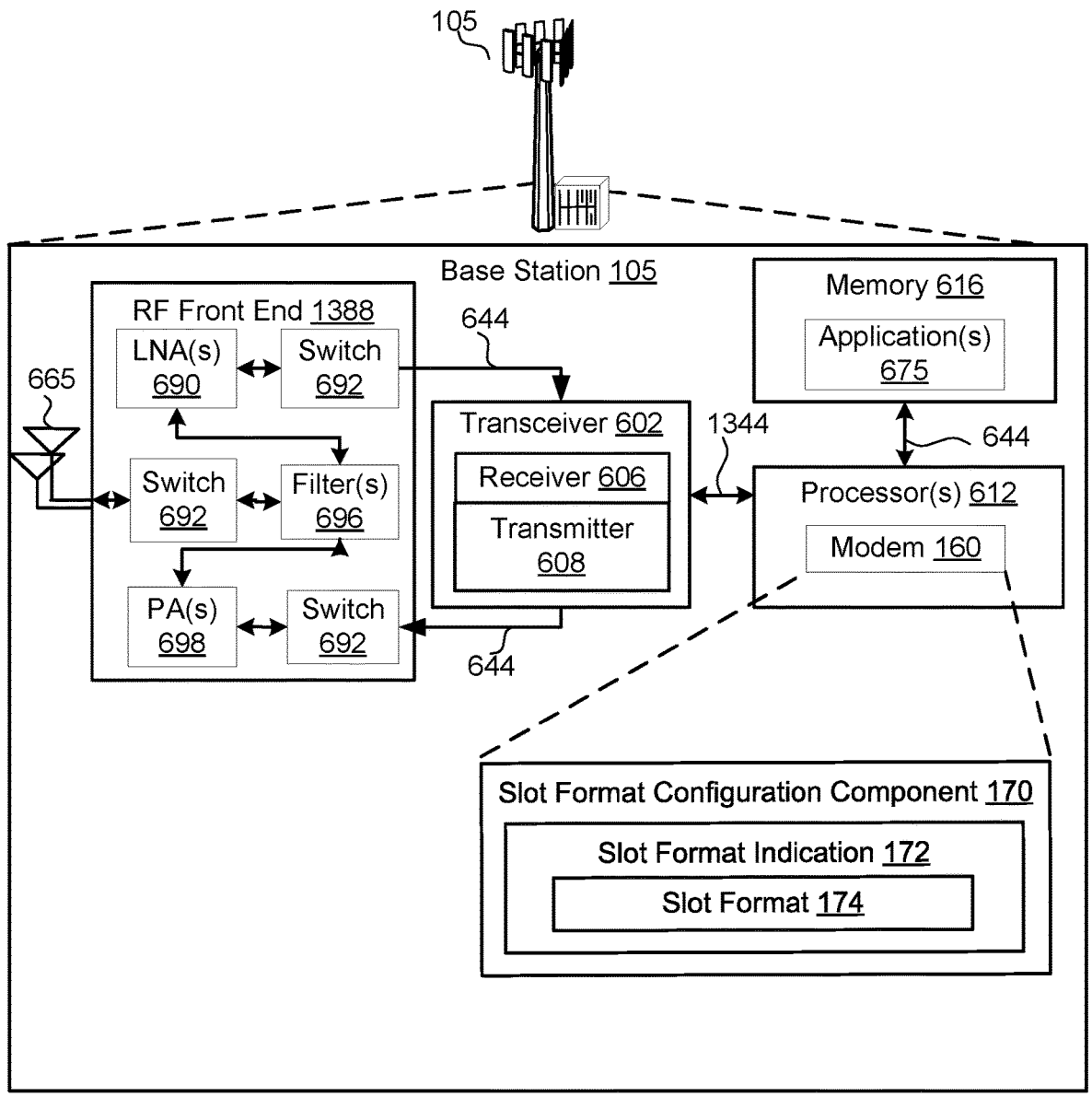
FIG. 6 is a schematic diagram of example components of the base station of FIG. 1.

Referring to FIG. 6, one example of an implementation of base station 105 may include a variety of components, some of which have already been described above, but including components such as one or more processors 612, a memory 616, and a transceiver 602 in communication via one or more buses 644, which may operate in conjunction with modem 160 and slot format configuration component 170 to enable one or more of the functions described herein.

The transceiver 602, receiver 606, transmitter 608, one or more processors 612, memory 616, applications 675, buses 644, RF front end 688, LNAs 690, switches 692, filters 696, PAs 698, and one or more antennas 665 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications at a user equipment, comprising:
receiving, from a network entity, a configured slot format according to a semi-static configuration via a broadcast transmission based on a system information block (SIB) signaling, wherein the broadcast transmission corresponds to a cell-specific RRC; and
communicating with the network entity according to the slot format.

2. The method of claim 1, wherein the configured slot format according to the semi-static configuration includes at least one symbol partition and a transmission assignment for the at least one symbol partition.

3. The method of claim 2, wherein the transmission assignment includes at least one of a downlink assignment, an uplink assignment, an empty assignment, or a flexible assignment.

4. The method of claim 1, wherein the slot format is common across one or more bandwidths or component carriers.

5. The method of claim 4, further comprising monitoring one group common physical downlink control channel (GC-PDCCH) for the one or more bandwidths or component carriers sharing the slot format.

6. The method of claim 5, further comprising:
determining whether the GC-PDCCH has been detected in the received slot format indication; and
determining that periodic signaling is at least one of activated or deactivated based on determining that the GC-PDCCH has not been detected in the received slot format indication.

7. An apparatus for wireless communications, comprising:
a memory; and
a processor in communication with the memory, wherein the processor is configured to:
receive, from a network entity, a configured slot format according to of a semi-static configuration via a broadcast transmission based on a system information block (SIB) signaling, wherein the broadcast transmission corresponds to a cell-specific RRC; and
communicate with the network entity according to the slot format.

8. The apparatus of claim 7, wherein to configure the slot format according to the semi-static configuration, the processor is further configured to configure the slot format to include at least one symbol partition and a transmission assignment for the at least one symbol partition.

9. The apparatus of claim 8, wherein the transmission assignment includes at least one of a downlink assignment, an uplink assignment, an empty assignment, or a flexible assignment.

10. The apparatus of claim 7, wherein the processor is further configured to determine whether the slot format is configured according to a dynamic configuration via a group common physical downlink control channel (GC-PDCCH), wherein configuring the slot format according to the semi-static configuration is further based on determining that the slot format is not configured according to the dynamic configuration via the GC-PDCCH, and wherein to configure the slot format according to the dynamic configuration, the processor is further configured to configure the slot format based on an index value referencing the slot format in a table of slot formats.

11. The apparatus of claim 7, wherein the slot format is common across one or more bandwidths or component carriers.

12. The apparatus of claim 11, wherein the processor is further configured to monitor one group common physical downlink control channel (GC-PDCCH) for the one or more bandwidths or component carriers sharing the slot format.

13. The apparatus of claim 12, wherein the processor is further configured to:
determine whether the GC-PDCCH has been detected in the received slot format indication; and
determine that periodic signaling is at least one of activated or deactivated based on determining that the GC-PDCCH has not been detected in the received slot format indication.

14. An apparatus for wireless communications, comprising:
means for receiving, from a network entity, a configured slot format according to a semi-static configuration via a broadcast transmission based on a system information block (SIB) signaling, wherein the broadcast transmission corresponds to a cell-specific RRC; and
means for communicating with the network entity according to the slot format.

15. The apparatus of claim 14, wherein the configured slot format according to the semi-static configuration includes at least one symbol partition and a transmission assignment for the at least one symbol partition.

16. The apparatus of claim 15, wherein the transmission assignment includes at least one of a downlink assignment, an uplink assignment, an empty assignment, or a flexible assignment.

17. The apparatus of claim 14, wherein the slot format is common across one or more bandwidths or component carriers.

18. The apparatus of claim 17, further comprising means for monitoring one group common physical downlink control channel (GC-PDCCH) for the one or more bandwidths or component carriers sharing the slot format.

19. The apparatus of claim 18, further comprising:
first means for determining whether the GC-PDCCH has been detected in the received slot format indication; and
second means for determining that periodic signaling is at least one of activated or deactivated based on determining that the GC-PDCCH has not been detected in the received slot format indication.

20. An apparatus for wireless communications, comprising:
a memory; and
a processor in communication with the memory, wherein the processor is configured to:
configure a slot format according to a semi-static configuration via a broadcast transmission associated with a system information block (SIB) signaling wherein the broadcast transmission corresponds to a cell-specific radio resource connection (RRC); and
communicate with at least one user equipment (UE) according to the slot format.

21. The apparatus of claim 20, wherein to configure the slot format according to the semi-static configuration, the processor is further configured to configure the slot format to include one or more symbol partitions and a transmission assignment for each of the one or more symbol partitions.

22. The apparatus of claim 21, wherein the one or more symbol partitions correspond to a length longer than a slot or shorter than the slot.

23. The apparatus of claim 21, wherein the transmission assignment for each of the one or more symbol partitions includes at least one of a downlink assignment, an uplink assignment, an empty assignment, or an flexible assignment.

* * * * *